United States Patent [19]

Guimbal

[11] 4,388,543
[45] Jun. 14, 1983

[54] HIGH-POWER LINEAR ELECTRIC MOTOR

[75] Inventor: Jean Guimbal, Saint-Etienne, France

[73] Assignee: Agence Nationale de Valorisation de la Recherche - A.N.V.A.R., Paris, France

[21] Appl. No.: 335,168

[22] Filed: Dec. 28, 1981

[30] Foreign Application Priority Data

Dec. 29, 1980 [FR] France ............................ 80 27953

[51] Int. Cl.³ ........................................... H02K 41/00
[52] U.S. Cl. ..................................... 310/13; 104/290; 310/64
[58] Field of Search ................................. 310/12–14, 310/64, 65; 104/148 LM, 148 R, 148 MS

[56] References Cited

U.S. PATENT DOCUMENTS 3,967,561 7/1976 Schwärzler ................. 104/148 LM
4,172,229 10/1979 Guimbal ............................ 310/13

*Primary Examiner*—Donovan F. Duggan
*Attorney, Agent, or Firm*—McAulay, Fields, Fisher, Goldstein & Nissen

[57] ABSTRACT

A high-power linear electric motor comprises an inductor constituted by annular coils surrounding a magnetic core of square or rectangular section, and an armature having an omega section enveloping this inductor on three sides, so as to ensure the passage both of the magnetic flux and of the induced currents. The armature comprises, outside, a magnetic layer extending upon the whole conductive layer, that is to say as well upon the upturned U central part as upon the two side horizontal flanges of the armature.

17 Claims, 6 Drawing Figures

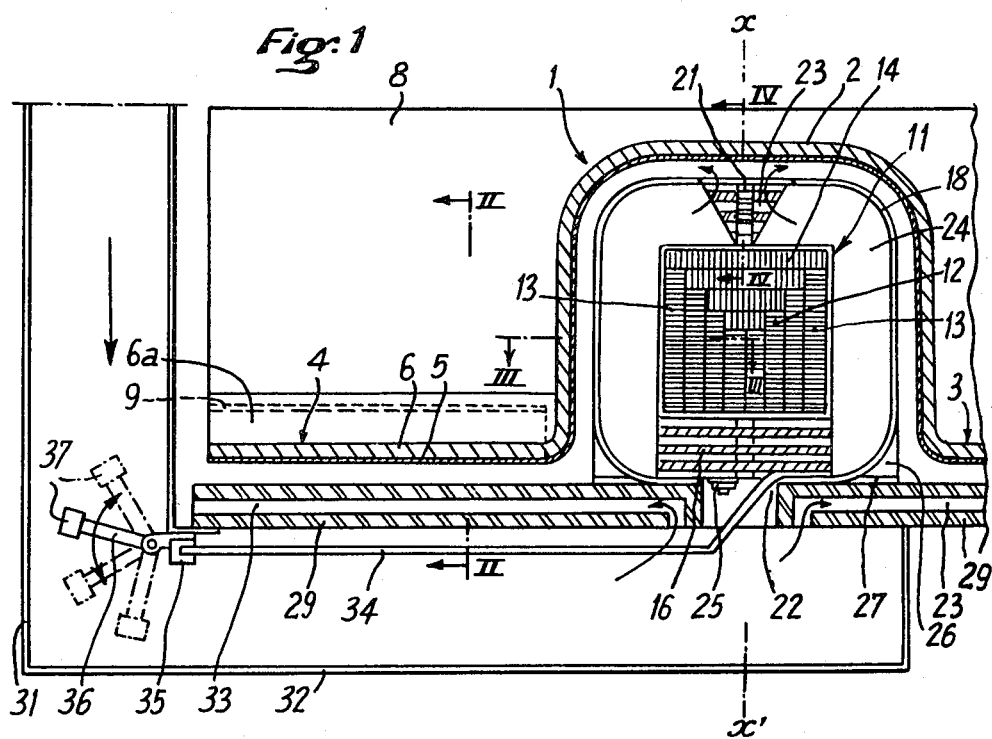

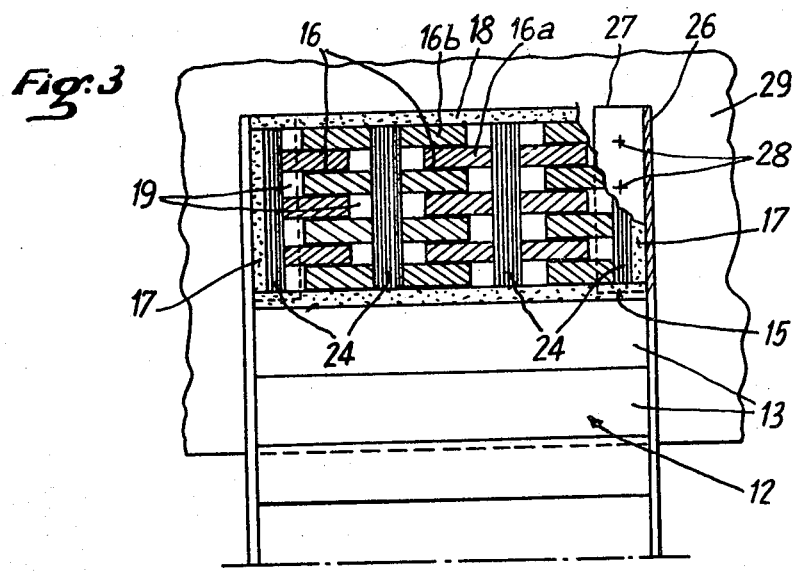
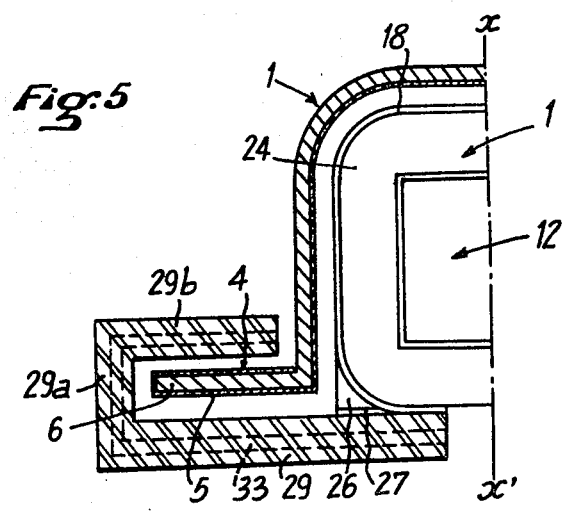
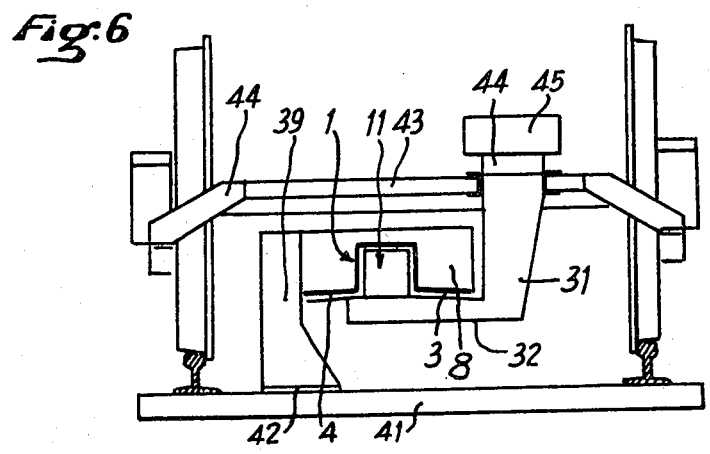

HIGH-POWER LINEAR ELECTRIC MOTOR

BACKGROUND OF THE INVENTION

The present invention relates to a high-power linear electric motor.

So-called "U-form" linear motors are already known, which comprise (i) an inductor constituted by square or rectangular coils wound around a likewise square or rectangular core and held by a generally U-sectioned support, and (ii) an armature having the form of a U or an omega encompassing the prismatic bar constituted by the inductor and its support.

These motors, of which certain are described in U.S. Pat. No. 4,172,229 have the drawback of the height of the U being large dimensioned. This is a particular hindrance when it is desired to adapt these motors to railway bogie trucks, to magnetic life or air-cushion systems. In addition, the U-support which characterizes them is both difficult to make and to cool.

SUMMARY OF THE INVENTION

It is essentially an object of the present invention to remedy these drawbacks by a particularly simple design of the armature and of the inductor, enabling high yield and good cooling to be obtained.

To this end, this high-power linear electric motor, comprising an inductor constituted by annular coils surrounding a magnetic core of square or rectangular section, and an armature having an omega section enveloping this inductor on three sides, so as to ensure the passage both of the magnetic flux and of the induced currents, is characterized in that the armature comprises, outside, a magnetic layer extending upon the whole conductive layer, that is to say as well upon the upturned U central part as upon the two side horizontal flanges of the armature.

The motor according to the invention offers the advantages that its dimensions in height are reduced by the whole width of the parts bend back by 90° and, in addition, the omega-sectioned armature may be arranged with its opening downwards, this eliminating any danger of blocking by the presence of snow, hail or stones.

In addition, with such an embodiment, the motor is easier both to make and to cool. As it is less awkward to widen the flanges where the longitudinal currents circulate, it is possible to obtain a motor furnishing a greater thrust for a given weight.

Particular arrangements for the joins between the sections of armature, the lamination of the core, the slabs which constitute the winding and the magnetic teeth which separate these slabs, as well as for the support, make it possible to obtain a motor of which the technological simplicity and cooling capacity are much greater than those of all heretofore known motors.

A casing extending along the support and containing a multiple contact switch connected to all the coils enables a multi-speed motor to be obtained.

BRIEF DESCRIPTION OF THE DRAWINGS

The invention will be more readily understood on reading the following description with reference to the accompanying drawings, in which:

FIG. 1 is a partial view in transverse section of a linear electric motor according to the invention.

FIG. 2 is a partial view in longitudinal and vertical section along line II—II of FIG. 1.

FIG. 3 is a partial view in longitudinal and horizontal section along line III—III of FIG. 1.

FIG. 4 is a partial view in vertical, axial section along line IV—IV of FIG. 1.

FIG. 5 is partial view in transverse section through a variant embodiment of the linear electric motor according to the invention.

FIG. 6 is a schematic view in transverse section of a linear electric motor according to the invention adapted to a railway bogie truck.

DESCRIPTION OF THE PREFERRED EMBODIMENTS

Referring now to the drawings, the linear electric motor according to the invention comprises a fixed armature 1 extending along the whole of the railway line and having an omega-shaped transverse section. This armature 1 comprises a central part 2 forming a section in the form of an upturned U, this central part being extended, at the ends of its two vertical downwardly extending sides, by two horizontal flanges 3 and 4, coplanar and symmetrical with respect to the vertical and longitudinal plane of symmetry xx' of the motor. The armature 1 is constituted by two adjacent, separate parts, namely an inner conducting part 5 and an outer magnetic part 6. These two parts are constituted by layers of metals which are respectively conducting and magnetic and they are mounted along the railway line by successive sections in the longitudinal direction. As shown in FIG. 2, each conducting section 5 is fixed to the immediately superposed magnetic section 6 solely at its centre, at point 7. This allows differences in expansion between the conducting sections 5 and magnetic sections 6.

The passage of the magnetic flux from one magnetic section 6 to a following section is improved due to vertical, transverse magnetic plates 8 fixed at the ends of the two successive magnetic sections 6. FIG. 2 shows that the two transverse plates 8 are advantageously welded to transverse edges 6a of the magnetic sections 6, these edges being bent upwardly. The two transverse plates 8 are fixed so as to form therbetween a gap just sufficient to allow expansions.

To ensure continuity of the currents in the armature 1 in the longitudinal direction, the join between two successive conducting sections 5 is made by means of a connecting plate 9 of upturned U section, of which the edges of the lower sides are welded to the opposite ends 5a of the two conducting sections 5. These ends 5a are advantageously bent upwardly to form curved edges to which the connecting plate 9 of upturned U section is welded. This plate 9 is housed in the space between the two upwardly curved edges 6a of the upper magnetic sections 6.

According to a variant embodiment, the connecting plate 9 could be housed at the base of the gap defined between the two transverse plates 8, these two plates being slightly inclined so as to converge upwardly. The mobile inductor 11 of the linear electric motor according to the invention comprises a longitudinal core 12 which must send magnetic flux in the whole central part 2 of the omega shaped armature 1 and which should be laminated in all directions where it sends this flux. As this is not possible, the core 12 is laminated horizontally in the zones 13 located mainly along the vertical sides of the central upturned U-shaped part 2 of the armature 1, and vertically in the zone 14 located mainly at the end of this hollow central part, i.e. the upper web of the upturned U cross section. These laminated parts are subdivided into strips which are sufficiently thin to lend themselves, without causing excessive losses, to the circulation of a flux slightly oblique with respect to the direction of lamination.

The magnetic core 12 is surrounded by an insulating mandrel 15 about which the winding 16 of the inductor 11 is disposed. This inductor winding 16 is subdivided into coils, being shown in horizontal and longitudinal section in FIG. 3. This Figure shows that the coil comprises, in addition to the inner insulating mandrel 15, insulating frontal sides 17 at the two longitudinal ends of the coil and an outer insulating envelope 18.

Each coil of the winding 16 is constituted by flat slabs each formed by flat strips 16a and 16b, or groups of flat strips, which are disposed so that, from one turn to the other or from one group of turns to the other, they are offset alternately on one side and the other. FIG. 3 in fact shows that all the strips 16b or groups of strips 16b are offset towards the left with respect to the strips or groups of strips 16a disposed between the preceding ones. This alternate offset enables cooling channels 19 of rectangular section, disposed in quincunx to be formed between the strips, which offer a much larger cooling surface then the flat annular channels usually provided. In this way, a much better cooling is obtained.

Notched spacers 21 maintain the offset relationship between the strips 16a and 16b. These spacers are located in the longitudinal and vertical plane of symmetry xx', respectively below and above the central core 13, at the location of the lower air intake 22 and the upper air outlet 23. These spacers 21 are thus disposed so as not to hinder the flow of cooling air through the channels 19 defined between the strips 16a and 16b of the winding 16.

Between the different slabs of turns are placed transverse laminated magnetic plates 24 which conduct the magnetic flux. As these plates 24 must conduct the flux in three directions, they are in the form of an upturned U, i.e. the opening of the U is at the bottom, towards the opening of the omega-shaped inductor 1. The connections 25 connecting the different slabs to one another pass in this opening.

In their top part, the magnetic plates 24 present a triangular, or, better, trapezoidal cut-out as shown in FIG. 1, at the level of the spacers 21 and the air outlet 23. In other words, each magnetic plate 24 terminates in an edge which is inclined upwardly and outwardly, i.e. moving away from the longitudinal plane of symmetry xx'.

The magnetic plates 24 are placed inside the insulating protecting envelope 18 of the coil so that the expensive positioning, which consists in insulating each slab separately, is avoided.

Other transverse magnetic plates 26 are placed between the various coils. The lower part of these plates 26 is bent so as to form a short fold 27 at right angle This short fold 27 is fixed, by means of fixing members 28, to a horizontal conducting plate 29 extending in width beneath the whole of the armature 1 and projecting slightly with respect thereto as may be seen in FIG. 1. This conducting plate 29 replaces the U-support of the U-shaped motor and it may take this very simple form by bending the ends of this U, leading to the omega shape. The assembly constituted by the magnetic core 12, the coils constituting the winding 16 and the magnetic plates 24, is thus firmly fixed to the lower conducting plate 29 via the transverse plates 26.

The horizontal conducting plate 29 also forms, like the U-support of the U-shaped motor, a screen with respect to the leakage fluxes, in that it is the seat of induced currents which compensate the parts of the induced and inductor currents which cannot be compensated mutually. To this end, it is a good electrical conductor.

The motor according to the invention further comprises a cooling system comprising a lateral descending conduit 31 which extends vertically and which is disposed to the side of the armature 1. The upper part of this descending conduit 31 is connected to a source of cooling air. Its lower end is extended by a horizontal casing 32 disposed beneath the lower conducting plated 29 in the central part of which is located the air intake 22. This cooling air circulates, as indicated by the arrows in FIG. 1, penetrating through the inductor through the air intake 22 and then passing on either side of the central core 12, in the cooling channels 19 made between the strips 16a, 16b, and this cooling air escapes to the outside, passing through the air outlet 23. The lower conducting plate 29 is also provided with cooling conduits 33 which are pierced horizontally in width. These conduits 33 open on the one hand in the two outer vertical sides of the lower conducting plate 29 and on the other hand in the casing 32 through vertical holes made near the air intake 22. The lower conducting plate 29 is thus perfectly cooled.

The various coils of the winding 16 are connected to connections which terminate in contact studs 35 of which certain are connected to rotating knives 36. These knives 36 together constitute a multiple contact switch and they may ensure closure of a plurality of lines of contact (four in number in FIG. 1). The fixed studs 37 of these lines of contact are connected to studs 35 and to the phases of the electrical supply so that as many different couplings are obtained as there are lines of contact. Several different synchronism speeds may thus be obtained, for example 80 and 160 km/hr. (maximum speed 140 km/hr.) for a normal railway motor, 80, 160, 240 and 320 km/hr. (maximum speed 260 km/hr.) for a very high speed train motor. The same motor may be suitable for both applications: it suffices to simplify its multiple contact switch for the 140 km/hr. version.

FIG. 5 shows a variant embodiment which reduces the dimensions in width. In this case, the magnetic part 6 of the flange 4 of the omega-shaped armature 1 is much less wide than the conducting part 5. This conducting part is bent around the magnetic part 6 so as to cover its lower and upper faces. The sides of the conducting part 5 have a horizontally extending U-shaped section, whose width corresponds to the thickness of the flanges of the magnetic part 6 taken between the two sides of the U and opening towards the longitudinal plane of symmetry xx'. Correlatively, the lower plate 29 forming support for the inductor is bent above the flange 4 of the armature 1 so as to present a vertical side 29a which is extended by a horizontal flange 29b extending towards the plane of symmetry xx'. The flange 4 of the armature 1 is thus housed between the lower support plate 29 proper and the upper flange 29b forming an integral part of the support plate 29. The cooling channels 23 made in the plate 29 are naturally extended in the vertical side 29a and in the upper horizontal flange 29b.

FIG. 6 illustrates the adaptation of a motor according to the invention to a railway bogie truck. The opening of the omega shaped armature 1 is directed downwardly so that no blocking due to snow, hail or foul play is to be feared. The flanges 3, 4 present a slight, outwardly descending slope to promote flow of the rainwater and avoid the latter penetrating between the magnetic part and the conducting part.

The parts of the armature 1 are fixed on the railway by means of support plates 39 with which are integral the transverse magnetic plates 8 terminating the sections of the magnetic parts of the armature. These support plates 39 are themselves screwed on the ties 41 of the line via footings 42.

The inductor 11 of the motor is borne by its air intake conduit 31 which is itself borne by crosspieces 43 connected to longitudinal elements 44 directly borne by the axle boxes. Consequently, these longitudinal elements are not subjected to the displacements connected with the existence of the suspension. As to increase in the non-suspended weight, this is without drawback due to the extreme lightness of the motors designed according to the invention: their total weight is much less than that of the fraction of the speed reducer which is fast with the axles on the conventional motorised bogie trucks.

The circulation of cooling air in the inductor of the motor according to the invention is ensured by one or more fan 46 and air filter 45 assemblies mounted at the top end of the air intake conduit 31.

What is claimed is:

1. In a high-power linear electric motor, comprising an inductor constituted by annular coils surrounding a magnetic core of square or rectangular section, and an armature having an omega section comprising an upturned U central part and two horizontal side flanges, said upturned U central part enveloping said inductor on three sides so as to ensure the passage both of the magnetic flux and the induced currents, said armature comprises, outside, a magnetic layer extending upon the whole conductive layer, that is to say as well upon the upturned U central part as upon the two horizontal side flanges of the armature.

2. The linear electric motor of claim 1, wherein the armature is constituted by successive sections in the longitudinal direction, each of these sections comprising an inner part made of a metal which is a good conductor of electricity and an outer magnetic part, each conducting section being fixed to the immediately superposed magnetic section solely at its centre to allow differences in expansion between the conducting and magnetic sections.

3. The linear electric motor of claim 2, wherein the armature comprises vertical, transverse magnetic plates fixed at the ends of two successive magnetic sections, to allow the passage of the magnetic flux between two successive sections, the two transverse magnetic plates being fixed so as to form a gap therebetween just sufficient to allow expansions.

4. The linear electric motor of claim 2, wherein a connecting plate bent into an upturned U is welded to the two ends of two successive conducting sections to ensure passage of the induced current from one section the other.

5. The linear electric motor of claim 1, wherein the core of the inductor is laminated horizontally in the zones located mainly along the vertical sides of the central upturned U-shaped part of the armature, and vertically in the zone located mainly towards the end of this hollow central part, i.e. the upper web of the upturned U-section, each laminated part being itself subdivided into strips of small width.

6. The linear electric motor of claim 1, wherein the winding of the inductor is subdivided into coils, each constituted by flat slabs separated by transverse laminated magnetic plates in the form of an upturned U, the opening of this U being located towards the opening of the omega-shaped armature and allowing passage of the connections from slab to slab, the assembly of the slabs constituting a coil being protected by a common insulation constituted by an inner insulating mandrel, insulating frontal sides, at the two longitudinal ends of the coil, and an outer insulating envelope.

7. The linear electric motor of claim 6, wherein the various coils of the inductor are separated by magnetic plates in upturned U form, the opening of the U being located towards the opening of the U being located towards the opening of the omega-shaped armature.

8. The linear electric motor of claim 7, wherein the plates have short folds at right angles ensuring fixation of these plates on a lower horizontal plate forming support for the inductor.

9. The linear electric motor of claim 8, wherein the lower horizontal plate constituting the support of the inductor is made of a metal which is a good conductor of electricity, it extends substantially over the whole width of the omega-shaped armature and it is disposed opposite the flanges of this armature.

10. The linear electric motor of claim 6, wherein each flat slab of a coil of the winding is formed by flat strips or groups of flat strips which are disposed so that, frome one turn to the other, they are offset alternately from one side and the other, so as to form cooling channels, arranged in quincunx, between the strips.

11. The linear electric motor of claim 10, wherein it comprises notched spacers for maintaining the offset relationships between the strips, these spacers being located in the longitudinal and vertical plane of symmetry, respectively below and above the central core, at the location of a lower air intake and an upper outlet, these spacers being disposed so as not to hinder the flow of cooling air through the channels defined between the strips of the winding, this air penetrating in the inductor, in the lower part thereof, through the air intake made in the support plate and then passing on either side of the central core, in the cooling channels, to escape to the outside, passing through the air outlet.

12. The linear electric motor of claim 7, wherein the lower, horizontal plate forming support for the inductor bears, on the side opposite the armature, a horizontal casing disposed beneath the support plate and communicating with a lateral vertical conduit connected at its top part to a source of cooling air, the lateral vertical conduit serving as air intake whilst the lower horizontal casing serves as distributor of cooling air in all the air intakes made in the support plate beneath the various coils of the inductor.

13. The linear electric motor of claim 12, wherein the lower conducting plate forming support for the inductor is pierced with transverse cooling conducts which communicate with the lower horizontal air distribution casing, near the air intake, and which open out in the two outer vertical sides of the support plate.

14. The linear electric motor of claim 12, wherein the connections of the coils are connected to a multiple contact switch placed in the assembly formed by the vertical conduit and the horizontal casing and designed to connect the coils in different manners so as to allow several speeds to be obtained.

15. The linear electric motor of claim 14, wherein the connections of the various coils terminate in central studs on certain of which rotating knives may be applied, which electrically connect the relevant studs to lines of peripheral studs, themselves judiciously connected to the desired studs and to the outside supplies.

16. The linear electric motor of claim 2, wherein the flanges of the conducting part are bent back around the magnetic part so as to cover its lower and upper faces, the conducting part thus having a horizontally extending U-section, its width corresponding to the thickness of the magnetic part between the two sides of the U and opening towards the longitudinal plane of symmetry, and the lower plate forming support for the inductor is bent above the flange of the armature so as to present a vertical side which is extended by a horizontal flange extending towards the plane of symmetry.

17. The linear electric motor of claim 1, comprising an inductor mounted on the vehicle and an armature fixed on the railway, wherein this armature is disposed with the opening of its omega section directed downwards.

* * * * *